United States Patent
Corcodel et al.

(10) Patent No.: US 11,548,150 B2
(45) Date of Patent: Jan. 10, 2023

(54) APPARATUS AND METHOD FOR PLANNING CONTACT-INTERACTION TRAJECTORIES

(71) Applicant: Mitsubishi Electric Research Laboratories, Inc., Cambridge, MA (US)

(72) Inventors: Radu Corcodel, Quincy, MA (US); Aykut Onol, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 316 days.

(21) Appl. No.: 16/886,816

(22) Filed: May 29, 2020

(65) Prior Publication Data

US 2021/0370507 A1 Dec. 2, 2021

(51) Int. Cl.
*B25J 9/16* (2006.01)

(52) U.S. Cl.
CPC ........... *B25J 9/1664* (2013.01); *B25J 9/1633* (2013.01); *B25J 9/1653* (2013.01); *G05B 2219/40065* (2013.01); *G05B 2219/40467* (2013.01); *G05B 2219/40474* (2013.01)

(58) Field of Classification Search
CPC ........ B25J 9/1664; B25J 9/1633; B25J 9/163; B25J 9/1653; B25J 9/1656; G05B 221/40065; G05B 221/40467; G05B 221/39505; G05B 221/40465
See application file for complete search history.

(56) References Cited

U.S. PATENT DOCUMENTS

| 8,463,433 | B2 | 6/2013 | Nagasaka |
| 8,725,295 | B2 | 5/2014 | Okazaki |
| 2017/0001301 | A1 | 1/2017 | Kamiya |

OTHER PUBLICATIONS

Önol, et al., "Contact-Implicit Trajectory Optimization Based on a Variable Smooth Contact Model and Successive Convexification," May 20, 2019, 2019 International Conference on Robotics and Automation (ICRA), pp. 2447-2453 (Year: 2019).*
Aykut Ozgun Onol, Philip Long, Taskin Padir. "A Comparative Analysis of Contact Models in Trajectory Optimization for Manipulation" [Submitted on Jun. 4, 2018 (v1), last revised Jul. 30, 2018 (this version, v2)] Comments: 6 pages, 7 figures, 4 tables, IROS 2018 camera-ready version Subjects: Robotics (cs.RO).

* cited by examiner

*Primary Examiner* — Spencer D Patton
(74) *Attorney, Agent, or Firm* — Gennadiy Vinokur; Hironori Tsukamoto

(57) ABSTRACT

An apparatus and a method for planning contact-interaction trajectories are provided. The apparatus is a robot that accepts contact interactions between the robot and the environment. The robot stores a dynamic model representing geometric, dynamic, and frictional properties of the robot and the environment, and a relaxed contact model to representing dynamic interactions between the robot and the object via virtual forces. The robot further determines, iteratively until a termination condition is met, a trajectory, associated control commands for controlling the robot, and virtual stiffness values by performing optimization reducing stiffness of the virtual force and minimizing a difference between the target pose of the object and a final pose of the object moved from the initial pose. Further, an actuator moves a robot arm of the robot according to the trajectory and the associated control commands.

14 Claims, 9 Drawing Sheets

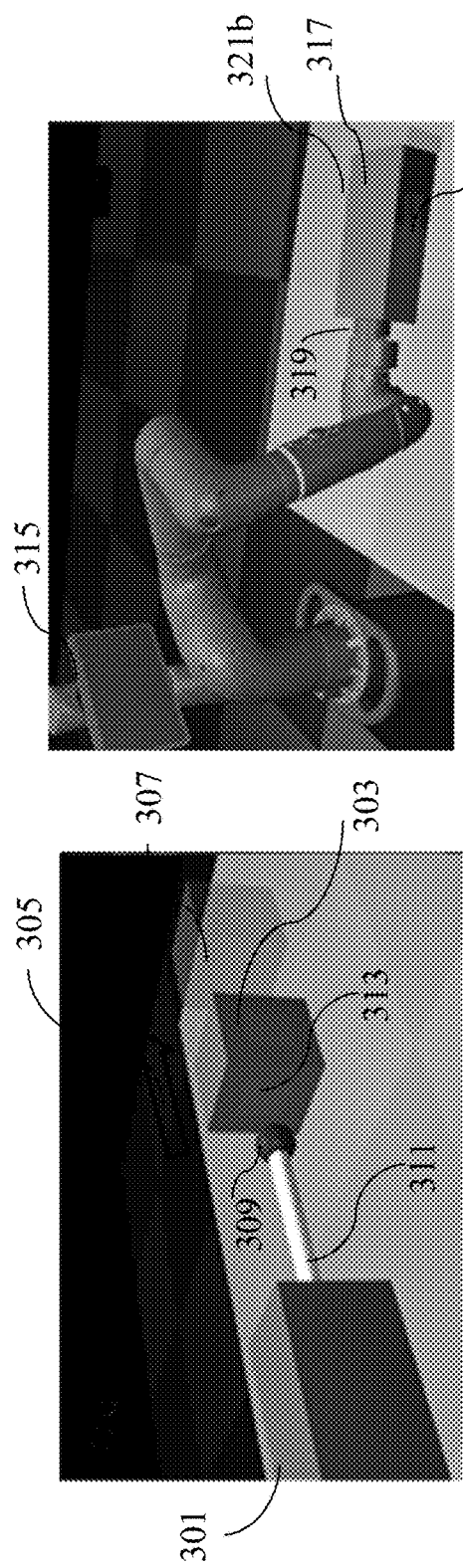
FIG. 3A
FIG. 3B
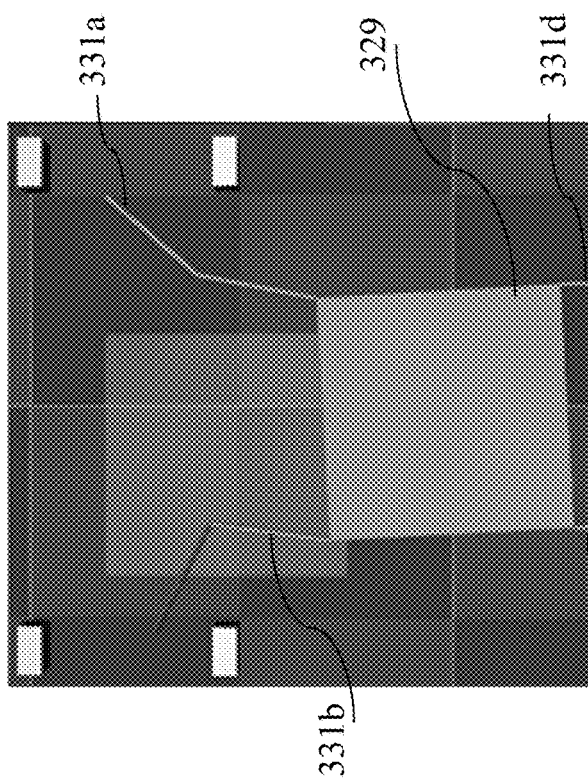
FIG. 3D
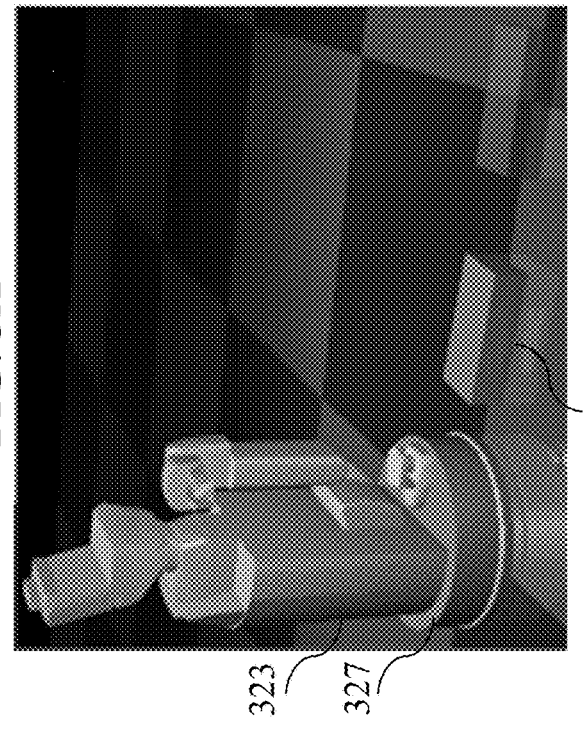
FIG. 3C

APPARATUS AND METHOD FOR PLANNING CONTACT-INTERACTION TRAJECTORIES

TECHNICAL FIELD

The present disclosure relates generally to robotics and more specifically to an apparatus and method for generalized planning of dynamic multi-contact trajectories without a predefined contact schedule.

BACKGROUND

In robotic systems, motion planning is used to determine a trajectory for a robot to perform a task that requires reaching a goal configuration (state of the robotic system) or end-effector pose given a current configuration. For efficient motion planning of the robot, various trajectory optimization techniques are used to find a feasible trajectory subject to robot's dynamics and task constraints. In other words, the trajectory optimization techniques aim to determine an input trajectory that minimizes a cost function subject to a set of constraints on the robotic system's states and inputs.

The trajectory optimization methods, typically, aim to avoid contacts between the robot and an environment, i.e., collision avoidance. However, contacts with the environment have to be utilized in a variety of robot manipulation and locomotion tasks. To that end, the contacts need to be considered in the trajectory optimization. The introduction of contacts into the robot's motion leads to non-smooth dynamics because of the discrete nature of contacts. For instance, making or breaking contacts with the environment or using different friction modes for a contact, such as sticking or sliding, change the dynamic constraints that determine the motion of the system given joint forces. This phenomenon precludes the use of the trajectory optimization for planning contact-interaction trajectories.

To overcome this shortcoming, a contact schedule is predefined by a user or generated by a higher-level heuristic planner. Such approach holds true for the motion planning involving a small number of contacts. However, for complex motion planning, predefining the contact schedule becomes computationally impractical.

In an alternative approach, contact-implicit trajectory optimization (CITO), which enables the motion planning of contact-rich complex motions without a predefined contact schedule, is used. The CITO simultaneously optimizes state, input, and contact force trajectories using a differentiable model for contact dynamics given only a high-level goal, such as the desired end pose for the system. The contact model, in which physical contacts are modelled as smooth functions, is an essential factor to enable gradient-based optimization to reason about contacts. Using a smooth contact model, which allows penetrations and/or contact forces at a distance, facilitates the convergence of the optimization. However, one or more parameters of the contact model and the cost function must be tuned to accurately approximate real contact dynamics while finding a motion that completes a given task. However, such tuning is difficult. Also, the contact model leads to physical inaccuracies due to the relaxations (penetrations and contact forces at a distance) that make numerical optimization efficient. Further, it may be required to re-tune the one or more parameters when the task or the robot is changed. Even for minor task variations, not re-tuning the one or more parameters may cause abrupt changes in the motion planned.

Therefore, there is a need for a tuning-free contact-implicit trajectory optimization technique to automatically determine a feasible contact-interaction trajectory given a system model and a task specification.

SUMMARY

It is an object of some embodiments to plan a motion for a robot to move an object to a target pose. It is another object of some embodiments, to plan motion for a robot to move an object via a physical contact between the object and the robot, e.g., between the object and a gripper of the robot, without grasping the object. One of the challenges of such a control is the lack of ability to use various optimization techniques for determining a suitable trajectory for the robot to achieve such contact interactions with the environment. For robotic manipulation, physical contacts behave as impulses and thus introduce non-smoothness into the dynamics, which in turn precludes the utilization of gradient-based solvers. To that end, a number of methods are proposed to determine the trajectory by testing a multitude of the trajectories. However, such generation of the trajectory is computationally inefficient and may not lead to a feasible result.

To that end, it is an object of some embodiments to introduce a model that represents contact dynamics between the robot and the environment, while allowing use of smooth optimization techniques in using such a model for planning a contact-interaction trajectory. Additionally, or alternatively, it is another object of some embodiments to provide such a model that adds minimum number of additional parameters, has a structure allowing for efficient computation of the planning, leads to physically-accurate trajectories and is not sensitive to the initialization of the motion planning.

In the present disclosure, such a model is referred as a relaxed contact model that leverages a looped automatic penalty adjustment of the relaxation parameters. Specifically, in addition to physical (actual) forces acting on a robot and an object, such as an actuation of the robot according to a trajectory, an impulse received by the object in response to the robot touching, the friction force, as well as the force of gravity, the relaxed contact model also leverages virtual forces (that do not exist in the reality) as a vehicle to model and exploit the contacts between the robot end effector and the environment, e.g., an object for non-prehensile manipulation. Therefore, the virtual forces provide a smooth relationship between the dynamics of the unactuated degrees of freedom (represented as free bodies, e.g., objects to be manipulated or a torso of a humanoid robot) and the configuration of the system comprising of the robot and the free bodies through contacts.

In the present disclosure, contact geometries on the robot and the environment are defined by the user considering the task. For instance, a gripper or a link on the robot, the surfaces of an object to be manipulated, or a floor in case of locomotion. Further, the geometries are paired by the user such that using one or more of the contact pairs a given task can be completed. For instance, the gripper of the robot and all surfaces of the object can be paired for a non-prehensile manipulation application; or feet of the robot and the floor can be paired for a locomotion application. Further, each contact pair is assigned to a free body and nominal virtual force direction, which is to be rotated based on the configuration of the system. For instance, a contact pair between the robot's gripper and the surface of the object can generate a virtual force acting on center of mass of the object in a direction of a contact surface normal to the object. For example, using a pair including a front face (i.e., facing the robot) of the object may generate a forward pushing virtual force on the object, whereas using a right face may generate a left pushing virtual force at the center of mass of the object. In the case of locomotion, using a pair of the foot of a humanoid robot and the floor may generate a virtual force on torso that is calculated by projecting the virtual force at contact point, which is normal to the floor, onto the torso's center of mass.

In addition, in some embodiments, the magnitude of virtual force is represented as a function of a distance between the contact geometries in the contact pair. The virtual forces are penalized and gradually diminished during the optimization process, such that at the end of the optimization, the virtual forces are no longer present. This yields a motion of the robot that solves the task by using only physical contacts as the optimization converges. Having such a separate relaxation for discovering contacts (i.e., virtual forces) allows minimizing only the virtual forces, without considering frictional rigid-body contacts as decision variables. Hence, such a representation allows the relaxed contact model to annotate physical forces acting on the free bodies only with one new independent parameter, the penalty on the relaxation.

Accordingly, some embodiments utilize the relaxed contact model in underactuated dynamics with frictional rigid-body contacts describing robotic manipulation and locomotion motions and replace generic determination of the trajectory for robot control with multi-objective optimization over at least two objective terms, i.e., the pose of the object moved by the robot and the virtual forces and the magnitude of the virtual force. Specifically, the multi-objective optimization minimizes a cost function to produce a trajectory that penalizes the difference between a target pose of the object and the final pose of the object placed by the robot moving along the trajectory estimated with respect to the underactuated dynamics with frictional rigid-body contact mechanics and the relaxed contact model, while penalizing the virtual force.

Some embodiments perform the optimization by appropriately tuning the penalties on a pose deviation from the target pose and the virtual force such that the virtual forces and the pose deviation both converge to zero at the end of optimization without changing the penalty values. Such embodiments require re-tuning for each task. Some embodiments based on a realization that the optimization can be performed iteratively when a trajectory resulted from a previous iteration initialize the current iteration while adjusting the penalties. In addition, for each iteration, the magnitude of the virtual force is reduced. In such a manner, the previous trajectory with larger virtual force is processed without optimization to both reduce the virtual force and improve the trajectory in each iteration. In some implementations, the iterations are performed until a termination condition is met, e.g., the virtual force reaches zero or the optimization reaches a predetermined number of iterations.

Accordingly, one embodiment discloses a robot configured for performing a task involving moving an object from an initial pose of the object to a target pose of the object in an environment, the robot comprising: an input interface configured to accept contact interactions between the robot and the environment. The robot further comprises a memory configured to store a dynamic model representing one or more of geometric, dynamic, and frictional properties of the robot and the environment, and a relaxed contact model to represent dynamic interactions between the robot and the object via virtual forces generated by one or more contact pairs associated with a geometry on the robot and a geometry on the object, where the virtual force acting on the object at a distance in each contact pair is in proportion to a stiffness of the virtual force. The robot further comprises a processor configured to determine, iteratively until a termination condition is met, a trajectory, associated control commands for controlling the robot, and virtual stiffness values to move the object according to the trajectory by performing optimization reducing the stiffness of the virtual force and reducing a difference between the target pose of the object and a final pose of the object moved from the initial pose by the robot controlled according to the control commands via the virtual force generated according to the relaxed contact model.

For executing at least one iteration, the processor is configured to: determine a current trajectory, current control commands, and current virtual stiffness values for a current penalty value on the stiffness of the virtual force by solving an optimization problem initialized with a previous trajectory and previous control commands determined during a previous iteration with a previous penalty value on the stiffness of the virtual force; update the current trajectory and current control commands to reduce the distance in each contact pair to produce an updated trajectory and updated control commands to initialize the optimization problem in a next iteration; and update the current value of the stiffness of the virtual force for the optimization in the next iteration. The robot further comprises an actuator configured to move a robot arm of the robot according to the trajectory and the associated control commands.

Another embodiment discloses a method for performing, by a robot, a task involving moving an object from an initial pose of the object to a target pose of the object, where the method uses a processor coupled with instructions implementing the method, where the instructions are stored in a memory. The memory stores a dynamic model representing one or more of geometric, dynamic, and frictional properties of the robot and the environment, and a relaxed contact model to represent dynamic interactions between the robot and the object via virtual forces generated by one or more contact pairs associated with a geometry on the robot and a geometry on the object, where the virtual force acting on the object at a distance in each contact pair is in proportion to a stiffness of the virtual force. The instructions, when executed by the processor carry out steps of the method, comprising: obtaining a current state of interaction between the robot and the object; and determining, iteratively until a termination condition is met, a trajectory, associated control commands for controlling the robot, and virtual stiffness values to move the object according to the trajectory by performing optimization reducing the stiffness of the virtual force and reducing a difference between the target pose of the object and a final pose of the object moved from the initial pose by the robot controlled according to the control commands via the virtual force generated according to the relaxed contact model.

Further, for executing at least one iteration, the method further comprising: determining a current trajectory, current control commands, and current virtual stiffness values for a current penalty value on the stiffness of the virtual force by solving an optimization problem initialized with a previous trajectory and previous control commands determined during a previous iteration with a previous penalty value on the stiffness of the virtual force; updating the current trajectory and current control commands to reduce the distance in each virtually-active contact pair to produce an updated trajectory and updated control commands to initialize the optimization problem in a next iteration; and updating the current value of the stiffness of the virtual force for the optimization in the next iteration; and moving a robot arm of the robot according to the trajectory and the associated control commands.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 3A illustrates controlling a 1-degree of freedom (DOF) pusher-slider system based on optimized trajectory and associated control commands, according to an example embodiment of the present disclosure.

FIG. 3B illustrates controlling a 7-DOF robot based on optimized trajectory and associated control commands, according to an example embodiment of the present disclosure.

FIG. 3C illustrates controlling a mobile robot with cylindrical holonomic base based on optimized trajectory and associated control commands, according to an example embodiment of the present disclosure.

FIG. 3D illustrates controlling a humanoid like robot with a prismatic torso and cylindrical arms and legs with 2-DOF based on optimized trajectory and associated control commands, according to an example embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
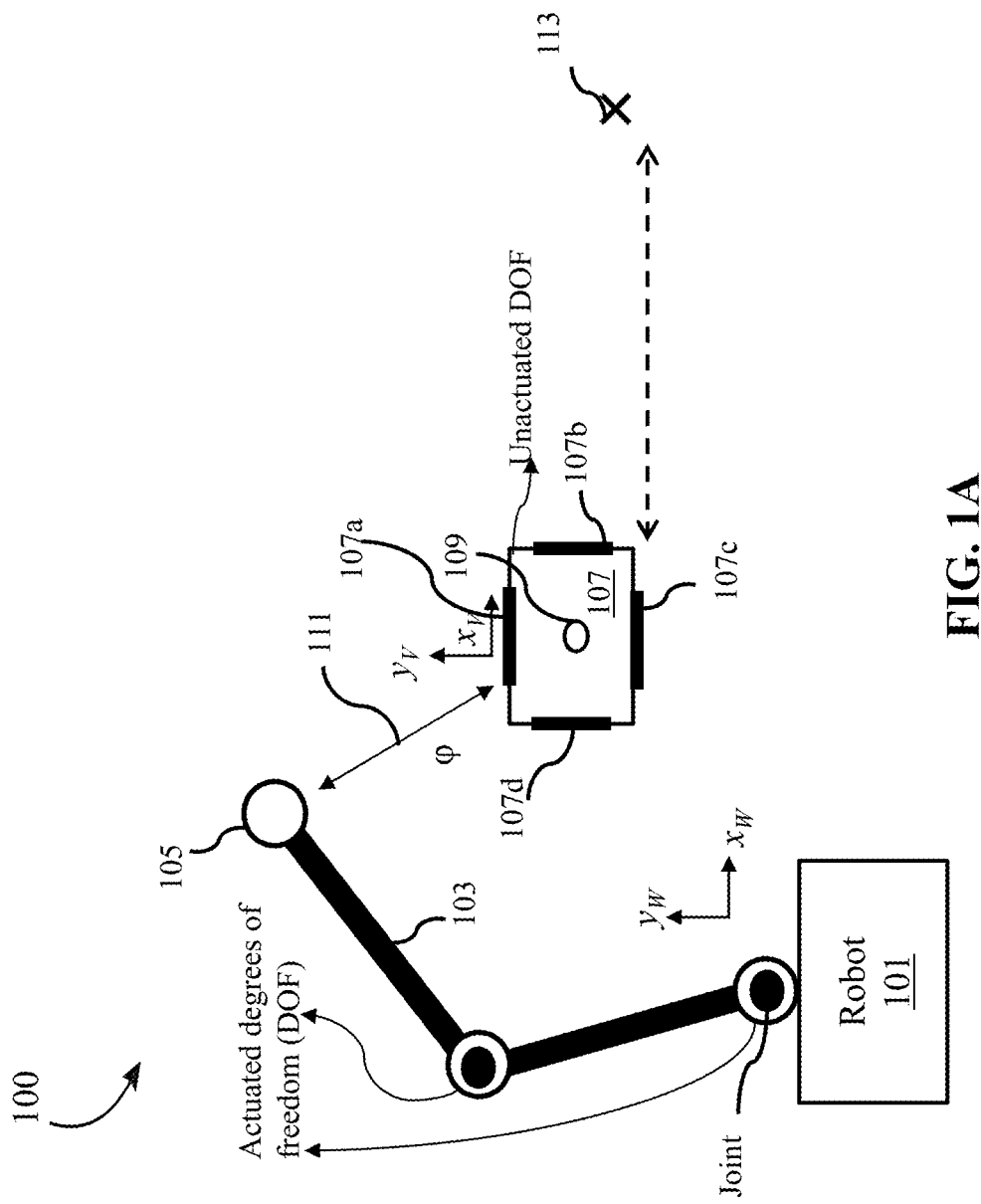
FIG. 1A illustrates an environment for a robot performing a task involving moving an object from an initial pose of the object to a target pose of the object, according to an embodiment of the present disclosure.
Figure 1B:
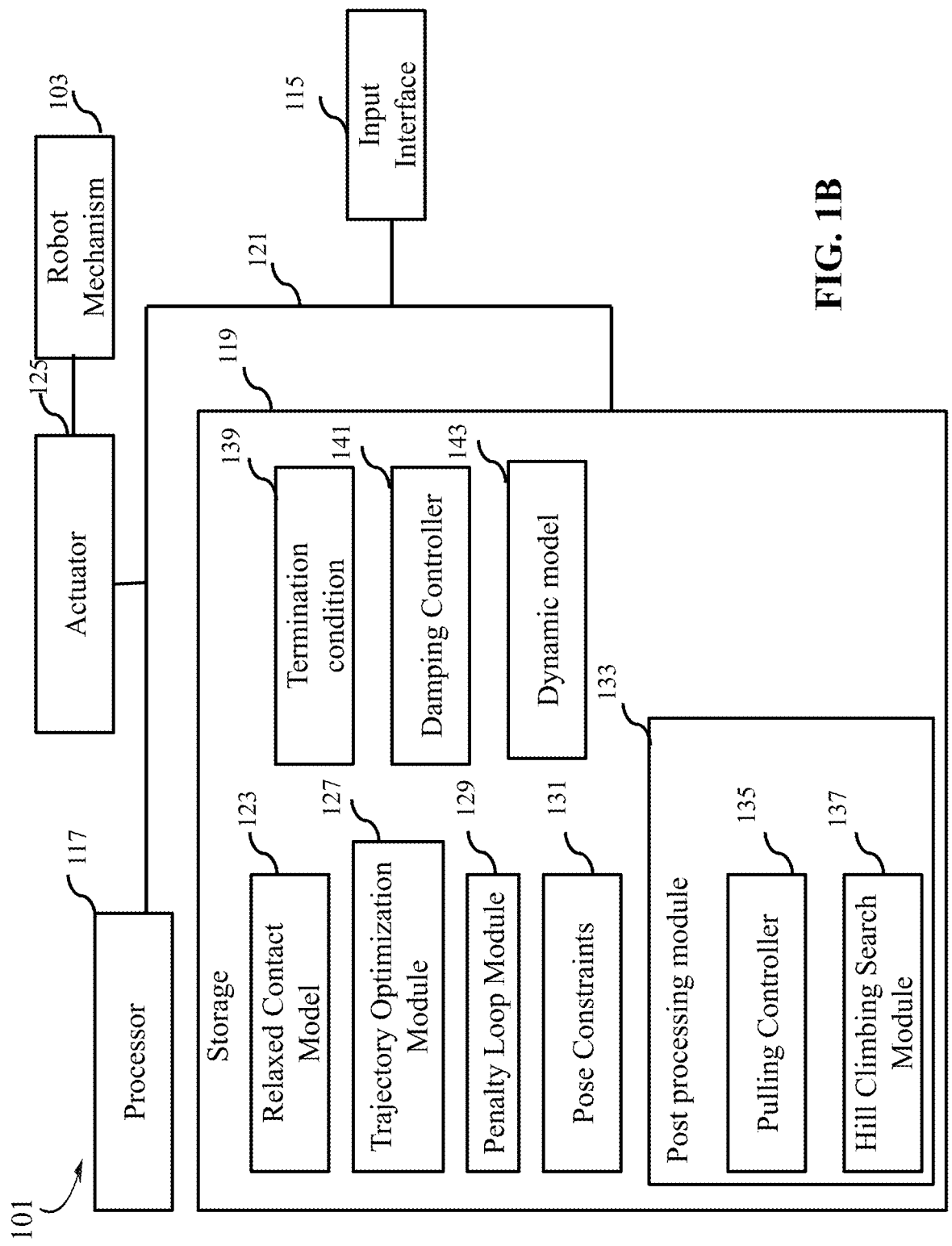
FIG. 1B illustrates a block diagram of the robot, according to an embodiment of the present disclosure.

FIG. 1A illustrates an environment 100 for a robot 101 performing a task involving moving an object 107 from an initial pose of the object 107 to a target pose 113 of the object 107, according to an embodiment of the present disclosure. Further, FIG. 1B illustrates a block diagram of the robot 101, according to an embodiment of the present disclosure. Execution of the task performed by the robot 101 is explained in detail with reference to FIG. 1A in conjunction with FIG. 1B. As illustrated in FIG. 1A, the robot 101 comprises a robot arm 103 which is used to perform a non-prehensile task such as pushing the object 107 from the initial pose of the object to the target pose 113. The target pose 113 may be an intended pose where a user wants to move the object 107. In some embodiment, the robot 101 may perform prehensile tasks such as gripping the object 107 to perform a task such as moving the object 107. To that end the robot 101 comprises an end effector 105 on the robot mechanism 103 that is actuated to move along a trajectory 111 to contact a surface of the object 107 in order to exert a virtual force on the object in order to move the object 107 from the initial pose to the target pose 113. The object 107 has a center of mass (CoM) 109. Further, there are four contact pairs in this case between the robot end effector 105 and at least one of the four contact candidates 107a, 107b, 107c, or 107d on the surface of the object 107 in the environment 100. Each contact pair has a distance ($\varphi$) and a stiffness (k) associated with it.

Further, the mobility of the robot 101, or a number of degrees of freedom (DOF), of the robot 101 is defined as the number of independent joint variables required to specify the location of all links (such as robot arm 103, robot end effector 105) of the robot 101 in space. It is equal to a minimal number of actuated joints to control the robot 101. As can be observed in the FIG. 1A, the robot 101 has two degrees of freedom (DOF), and the two DOFs are both actuated. Further, as observed in FIG. 1B the robot 101 comprises an input interface 115 that is configured to accept contact interactions between the robot 101 and the object 107. The input interface 115 may comprise proximity sensors, or the like. The input interface 115 may be connected to other components (such as a processor 117, storage 119, and the like) of the robot 101 through a bus 121. The processor 117 is configured to execute stored instructions stored in the storage 119. The processor 117 may be a single core processor, a multi-core processor, a computing cluster, or any number of other configurations. The storage 119 may be a random access memory (RAM), read only memory (ROM), flash memory, or any other suitable memory systems. The processor 117 may be connected through the bus 121 to the other components of the robot 101.

Some embodiments are based on the realization that the challenge of controlling the robot 101 to perform prehensile or non-prehensile task is lack of ability to use various optimization techniques for determining a suitable trajectory (for example, the trajectory 111) of the robot end effector 105 to achieve desired control. For robotic manipulation, physical contacts behave as impacts and thus introduce non-smooth dynamics, which in turn precludes the utilization of gradient-based solvers. Some embodiments are based on the realization that the trajectory can be determined in a manner by testing a multitude of the trajectories. However, such generation of the trajectory is computationally inefficient and may not lead to the optimal result.

To avoid such results, in some embodiments, the storage 119 of the robot 101 is configured to store a dynamic model 143 of the robot 101 and the environment 100. The dynamic model 143 represents geometric, dynamic, and frictional properties of the robot 101 and the environment 100. The storage further configured to store a relaxed contact model 123 of dynamics of the interaction between the robot 101 and the object 107 via a virtual force generated at one or more contact pairs associated with the robot end effector 105 and the surface (107a, 107b, 107c, or 107d) in the environment 100. The virtual force is represented by a virtual force acting on the object 107 at distance ($\varphi$) in each contact pair, where the virtual force is in proportion to a stiffness. The relaxed contact model 123 relates configurations of the robot 101 and the object moved by the robot 101 through the virtual forces that act from a distance (i.e., without a physical contact), while allowing the use of optimization techniques in using such a model for controlling the robot 101. Additionally, the relaxed contact model 123 adds minimum number of additional parameters. The relaxed contact model 123 has a structure that allows for effective computation of the control, leads to accurate control trajectory, and further the structure is not sensitive to initialization of the robot control.

Further, the processor 117 is configured to determine the trajectory 111 and associated control commands for controlling the robot 101 to move the object 107 to the target pose 113 according to the trajectory 111 by performing optimization that reduces the stiffness of the virtual force. Further, the optimization provides reduction in a difference between the target pose 113 of the object 107 and a final pose of the object 107 moved from the initial pose by the robot 101 controlled according to the control commands via the virtual force generated according to the relaxed contact model 123. The final pose of the object 107 may be the pose where the object 107 was moved earlier (for example, in previous iteration), where the final pose is still away from the target pose 113. The robot 101 is configured to reduce this difference between the target pose 113 and the final pose of the object 107 by using the optimization.

In order to reduce the stiffness of the virtual force, and the difference between the target pose 113 of the object 107 and the final pose of the object 107 moved from the initial pose by the robot 101, the processor 117 may be further configured to perform a multi-objective optimization of a cost function. The multi-objective optimization aims to achieve multiple competing objectives by performing optimization over at least two parameters. According to an embodiment, the multi-objective optimizes/reduces the stiffness and difference between the target pose 113 and a final pose of the object 107. Further, the cost function is a combination of a first cost to determine a positioning error of the final pose of the object 107 moved by the robot 101 with respect to the target pose 113 of the object 107, and a second cost to determine a cumulative stiffness of the virtual forces.

Further, the processor 117 may be configured to iteratively determine the trajectory 111 until a termination condition 139 is met. To that end, a trajectory in every iteration is analyzed to check whether the trajectory satisfies pose constraints 131 and the termination condition 139. The trajectory satisfying the pose constraints 131 and the termination condition 139 may be used as the trajectory 111 along which the robot 101 moves the robot arm 103 to move the object 107. The termination condition 139 may be met in case a number of iterations are greater than a first threshold or the virtual forces are reduced to zero. The first threshold may be determined by the robot 101 based on a possible number of iterations that may be required to move the object 107 from the initial pose to the target pose 113, distance ($\varphi$), or the like. In an example embodiment, the first threshold may be manually defined by a user.

For executing at least one iteration, the processor 117 is further configured to determine a current trajectory and current control commands for a current value of the stiffness of the virtual force by solving an optimization problem initialized with a previous trajectory and previous control commands. The previous trajectory and previous control commands are determined during a previous iteration with a previous value of the stiffness of the virtual force. The optimization problem focuses on optimizing the current trajectory to determine an optimal trajectory (for example, the trajectory 111) such that the robot 101 moves the object 107, to the target pose 113, from the initial pose or a pose between the initial pose and the target pose 113 (in case the object 107 has moved from the initial pose but has still not reached the target pose 113). The concept of trajectory optimization in the presence of contacts can be formulated as finding the contact positions, timings, and forces and robot control inputs, given a high-level task.

The processor 117 is further configured to update the current trajectory and current control commands to reduce the distance in each contact pair (i.e. contact between the robot end effector 105 and at least one surface of the surfaces 107a, 107b, 107c, or 107d of the object 107) to produce an updated trajectory and updated control commands to initialize the optimization problem in a next iteration, and update the current value of the stiffness of the virtual force for the optimization in the next iteration.

The robot 101 comprises an actuator 125 that is configured to move the robot arm 103 of the robot 101 according to the trajectory 111 and the associated control commands. The actuator 125 is in communication with the processor 117 and the robot arm 103 via the bus 121.

In an embodiment, the virtual force generated according to the relaxed contact model 123 corresponds to at least one contact pair of the four contact pairs between the robot end effector 105 and at least one surface 107a, 107b, 107c, or 107d. The virtual force may be based on one or more of a virtual stiffness, a curvature associated with the virtual force, and a signed distance ($\varphi$) between the robot end effector 105 and the surfaces 107a, 107b, 107c, and 107d of the object 107 associated with the contact pair. The virtual force points, at each instance of time during the interaction, a projection of a contact surface normal on the object 107 onto the CoM of the object 107.

Some embodiments are based on the realization that the introduction of contacts into trajectory optimization problem leads to non-smooth dynamics and thus precludes the use of gradient-based optimization methods in a variety of robot manipulation and locomotion tasks. To address this issue, in some embodiments, the robot 101 in the present disclosure may use a relaxed contact model 123 implemented by a processor 117 generates a contact-interaction trajectory 111 using the relaxed contact model 123 and a trajectory optimization module 127.

Some embodiments are based on the realization that to solve the trajectory optimization problem with reliable convergence characteristics, a successive convexification (SCVX) algorithm can be used, which is a special type of sequential quadratic programming. In this approach, convex approximations of an original optimization problem are obtained by linearizing the dynamic constraints about a previous trajectory, and convex subproblems are solved within a trust region. A radius of the trust region is adjusted based on the similarity of the convex approximations to the actual dynamics. In some embodiments, the robot 101 may use the SCVX algorithm in the trajectory optimization module 127 to calculate the trajectory 111 efficiently.

Some embodiments are based on the realization that to determine a solution to the optimization problem a smooth contact model may be used. In the smooth model the contact force is a function of the distance so that dynamic motions of the robot 101 can be planned. The smooth model facilitates convergence of iterations required to determine the optimal trajectory 111. However, the smooth model leads to physical inaccuracies and are quite difficult to tune.

To address this issue, in some embodiments, the robot 101 in the present disclosure may be configured to use a variable smooth contact model (VSCM) in which virtual forces acting at a distance are exploited to discover contacts while a physics engine is used to simulate existing contact mechanics. The virtual forces are minimized throughout the optimization. Consequently, physically-accurate motions are obtained while maintaining fast convergence. In such embodiments, the relaxed contact model 123 corresponds to the VSCM. The use of the VSCM along with the SCVX significantly mitigates sensitivity to initial guess of a trajectory and burden of tuning by reducing the number of tuning parameters to one, namely a penalty on the virtual stiffness. However, the robot 101 using the VSCM and the SCVX may still require re-tuning the penalty on the relaxation when the task or the robot is changed; and without extra tuning, abrupt changes may occur in the planned motions even with minor task modifications. Moreover, the resulting contacts are usually impulsive due to the structure of the contact model.

To address this issue, in some embodiments, the robot 101 may comprise a penalty loop module 129 that implements a specific penalty loop algorithm, for at least one iteration, associated with determining of the trajectory 111. In the specific penalty loop algorithm, the penalty of relaxation parameters (such as the virtual stiffness associated with the virtual forces) comprised by the relaxed contact model 123 is iteratively changed based on pose constraints 131.

To that end, the processor 117 is configured to execute the penalty loop module 129 to assign a first penalty value, as an updated penalty value, to the virtual stiffness associated with the virtual forces, where the assigned penalty value is greater than a penalty value assigned in a previous iteration, if the pose constraints 131 are satisfied. On the other hand, assign a second penalty value, as the updated penalty value, to the virtual stiffness associated with the virtual forces, where the assigned penalty value is less than a penalty value assigned in a previous iteration, if the pose constraints 131 are not satisfied. The pose constraints 131 comprise information about position error and orientation error, associated with the trajectory 111. More specifically, the pose constraints 131 are satisfied if a value of the position error is below a threshold value and a value of the orientation error is below a threshold value (e.g. the normalized position error is below 30% and the orientation error is below 1 rad).

Further, the processor 117 determines the current trajectory, associated control commands, and virtual stiffness values satisfying the pose constraints 131, and residual virtual stiffness that indicates position, timing, and magnitude of physical forces for performing the task.

Some embodiments are based on the realization that average stiffness associated with the current trajectory calculated by the penalty loop module 129 may create an impulsive contact force on the object 107 through the robot arm 103 that contacts the object 107. Such impulsive contact force on the object 107 may displace the object 107 undesirably. To address this issue, in some embodiments, the robot 101 uses a post processing module 133. The post processing is performed on the current trajectory to attract the geometry on the robot to the corresponding geometry in the environment to facilitate physical contacts, using a pulling controller 135. To that end, the processor 117 is configured to exploit information associated with the residual virtual stiffness variables that indicate the position, timing, and magnitude of forces required to complete the task. The pulling controller 135 is executed when an average of the virtual stiffness of the current trajectory is greater than a virtual stiffness threshold.

Figure 1C:
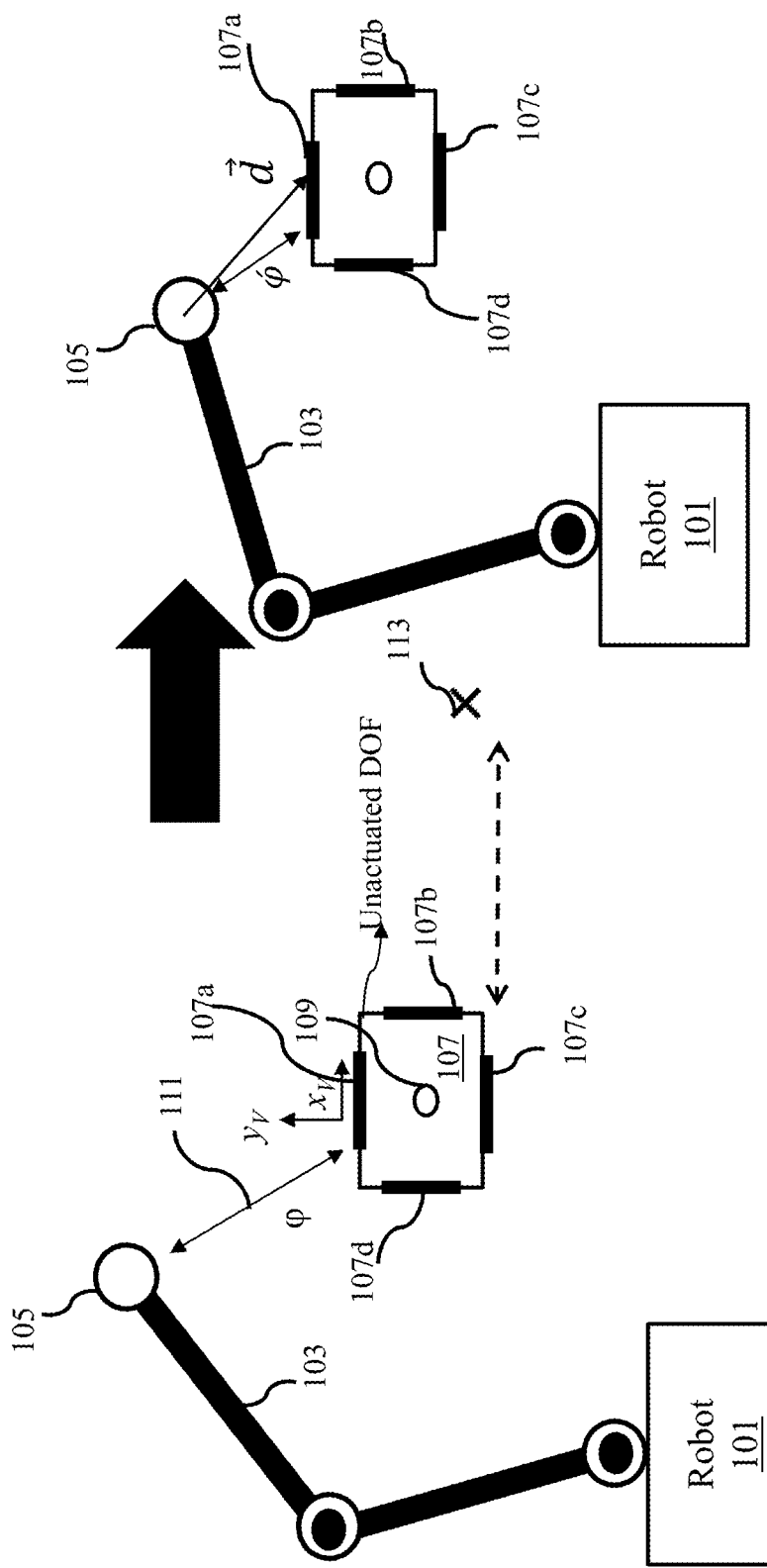
FIG. 1C shows a change in a distance ($\varphi$) as a result of execution of a pulling controller, according to some embodiments.

FIG. 1C shows a change in the distance ($\varphi$) as a result of execution of the pulling controller 135, according to some embodiments. The processor 117 uses the information associated with the residual virtual stiffness variables to execute the pulling controller 135 on the current trajectory to determine a pulling force f. The pulling force attracts virtually-active contact geometries on the robot 101 associated with non-zero virtual stiffness values towards the corresponding contact geometries on the object 107. For example, the distance $\varphi$ between the end effector 105 and the contact candidate 107a is changed to $\hat{\varphi}$. The distance $\hat{\varphi}$ is less than the distance $\varphi$. To that end, the pulling force is given by $$\vec{f} = k \times \vec{d}$$

where $\vec{d}$ is a distance vector from the geometric center of the contact candidate on the robot (e.g. end effector 105) to the geometric center of the contact candidate (e.g., the contact candidate 107a) in the environment, and k is the virtual stiffness value in the current trajectory.

To that end, after the pulling force f is applied the distance $\varphi$ gets smaller. However, the virtual stiffness value k may cause excessive virtual forces since magnitude of normal virtual force has an inverse proportion with the distance, i.e., $\gamma = k \times e^{-\alpha \varphi}$. To avoid such excessive virtual forces, the stiffness value is reduced by a hill-climbing search such that task constraints are satisfied. To that end, the processor 117 is configured to use the hill-climbing search implemented by a hill-climbing search (HCS) module 137. The hill-climbing search reduces the non-zero stiffness values one-by-one as long as the positioning error reduces. In an embodiment, the hill-climbing search uses a fixed step size. In an alternate embodiment, the hill-climbing search uses an adaptive step size. The pulling controller 135 and the HCS module 137 are comprised by the post-processing module 133. Thus, the post processing includes execution of the pulling controller and the hill-climbing search. According to an embodiment, the post process outputs a trajectory and associated control commands that satisfy the pose constraints, for the execution of the task. Therefore, the post process reduces the number of iterations to determine the trajectory. In other words, the post-processing improves the convergence. Further, the trajectory resulted by the post process is better than the current trajectory since it facilitates physical contacts and explicitly reduces the virtual stiffness values without deteriorating the task performance.

In some embodiments, the robot 101 further comprises a damping controller 141. The processor 117 is configured to execute the damping controller 141 to prevent the pulling controller 135 from generating abrupt motions for large stiffness values.

Some embodiments are based on the realization that by tuning the weights (or penalty values), the virtual forces vanish yielding a motion that solves the task by using only physical contacts as the optimization converges. In such embodiments, penalty on the virtual stiffness may be applied in the process of reducing the virtual force by tuning the penalty values, where a small penalty value may result in physically-inconsistent motions due to leftover virtual forces. Further, a motion that completes the task may not be found if the penalty value is too large. Although the tuning of this penalty is fairly straightforward, it hinders the generalization of the method for a wide range of tasks and robots. In order to address this issue, in some embodiments of the present disclosure utilizes the penalty loop algorithm that automatically adjusts the penalty. Furthermore, the determined trajectory, associated control commands, and virtual stiffness values are improved after each iteration through the above-described post-processing stage.

Figure 2A:
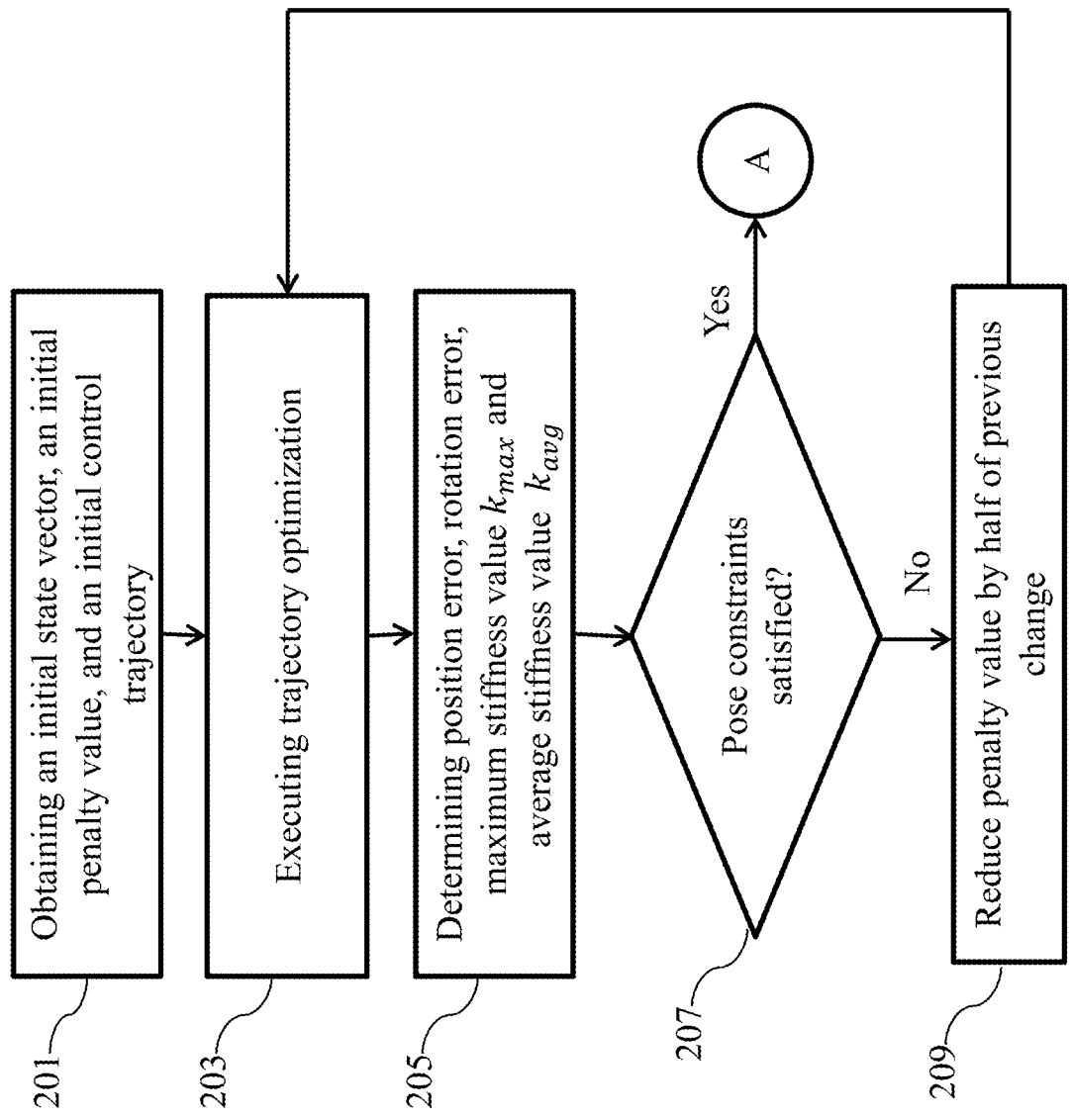
FIG. 2A illustrates steps executed by a penalty loop algorithm when the current trajectory does not satisfy the pose constraints, according to an embodiment of the present disclosure.

FIG. 2A illustrates steps executed by the penalty loop algorithm when the current trajectory does not satisfy the pose constraints 131, according to an embodiment of the present disclosure. In some embodiments, the processor 117 may be configured to execute the steps by the penalty loop algorithm.

At step 201, an initial state vector representing a state of the robot 101, an initial penalty value to tune the relaxation parameters (for example, virtual stiffness) comprised by the relaxed contact model 123, and an initial control trajectory to be optimized to obtain an optimal trajectory 111 to move the object 107 with zero virtual force, may be obtained.

At step 203, the trajectory optimization module 127 may be executed based on the initialized values of the initial state vector, the penalty, and the control trajectory to determine a current trajectory, current control commands, and current virtual stiffness values. The successive convexification algorithm can significantly mitigate the sensitivity to the initial guess, and the variable smooth contact model can reduce the number of tuning parameters to one, namely a penalty on the virtual stiffness.

At step 205, performance parameters may be evaluated, where the performance parameters may comprise position error, orientation error, maximum stiffness value $k_{max}$ and average stiffness value $k_{avg}$. The position error and orientation error are comprised by the pose constraints 131.

At step 207, it may be checked whether the current trajectory satisfies the pose constraints 131 or not. The control passes to step 211 when the determined trajectory satisfies the pose constraints 131. On the other hand, when the current trajectory does not satisfy the pose constraints 131, the control passes to step 209.

At step 209, the penalty values assigned to the relaxation parameters may be reduced by half of previous change and these values may be fed back to the step 203, where the trajectory optimization module 127 is executed with these values to determine a new optimized trajectory in the next iteration that satisfies the pose constraints 131 at step 207.

Figure 2B:
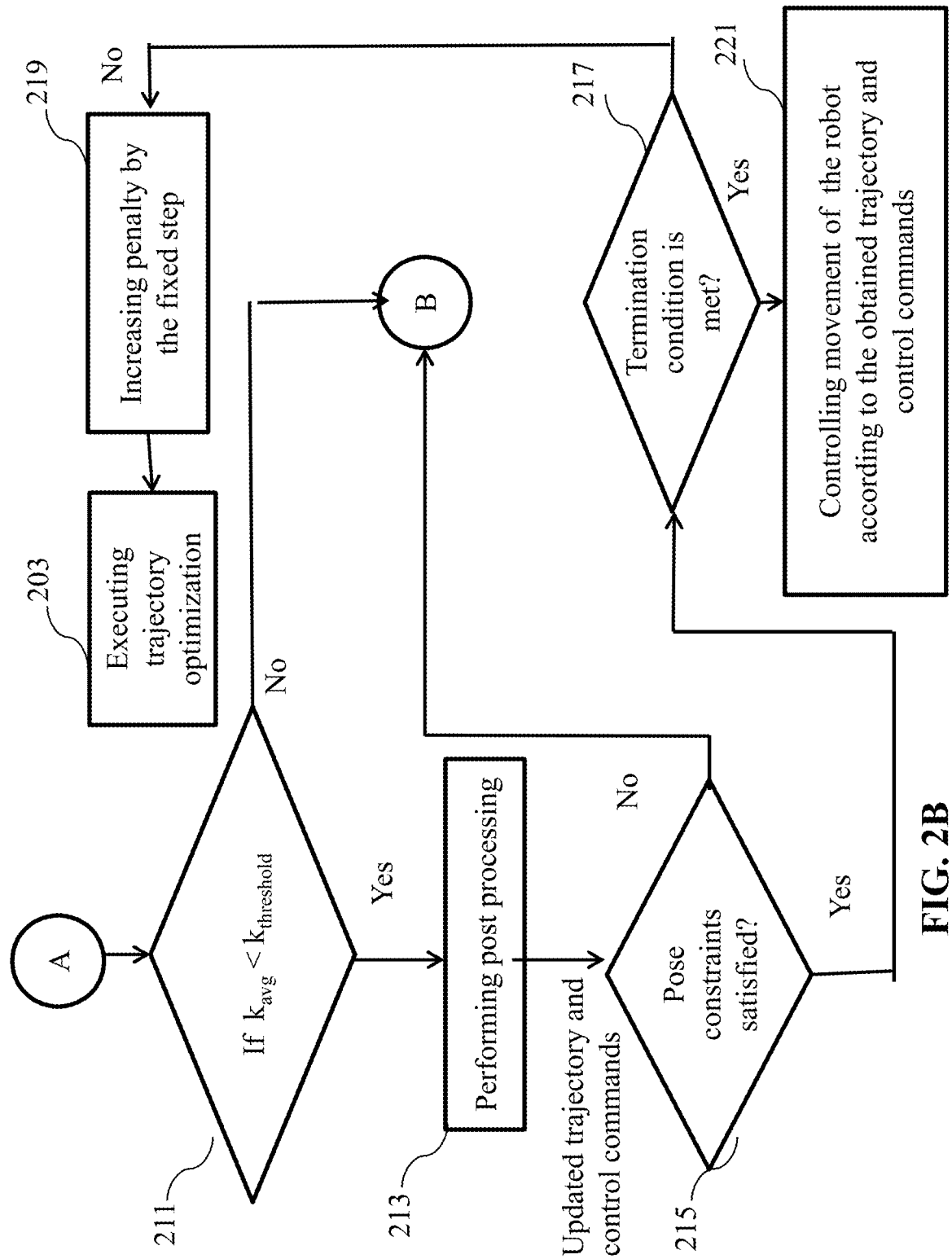
FIG. 2B illustrates steps executed by the penalty algorithm when the current trajectory satisfies the pose constraints, according to an embodiment of the present disclosure.

FIG. 2B illustrates steps executed by the penalty algorithm when the current trajectory satisfies the pose constraints 131, according to an embodiment of the present disclosure.

At step 211, it may be checked whether the average stiffness value $k_{avg}$ is less than the threshold stiffness value $k_{threshold}$, when the determined trajectory satisfies the pose constraints 131. On determining that the average stiffness value $k_{avg}$ is less than $k_{threshold}$, the control passes to step 213. Otherwise, the control passes to step 223.

At step 213, the post processing may be performed on the determined trajectory based on the average stiffness value $k_{avg}$ being less than the threshold stiffness value $k_{threshold}$. The post processing step improves the current trajectory and associated current control commands by exploiting the contact information implied based on penalty values to adjust relaxation parameters (such as the virtual stiffness associated with the virtual forces) in previous iteration. Further, the post processing step attracts the robot links (or robot end effector 105 of the robot arm 103) associated with the non-zero stiffness values towards the corresponding contact candidates in the environment 100 using a pulling controller 135. Consequently, performing the post process 213 yields the updated trajectory, updated control commands, and updated virtual stiffness values.

At step 215, it may be determined whether the trajectory, the associated control commands, and virtual stiffness values updated during the post processing step 213 satisfy the pose constraints 131 or not. In case that the pose constraints 131 are satisfied, the control passes to step 217. Otherwise, the control passes to step 223.

At step 217, it may be determined whether the termination condition 139 is met. The control passes to step 219, in case the termination condition 139 is not met. Otherwise, the control passes to step 221. The termination condition 139 may be met in case a number of iterations are greater than a first threshold or the virtual stiffness values are reduced to zero.

At step 219, the penalty value may be increased by a fixed step when the termination condition 139 is not met. Further, the control passes to step 203.

At step 221, the robot 101 may be controlled according to the current trajectory and the associated current control commands, and current virtual stiffness values. In some embodiments, the actuator 125 is controlled to move the robot arm 103 according to the trajectory and the associated control commands. The execution of the steps of the penalty algorithm ends after the execution of step 219.

Figure 2C:
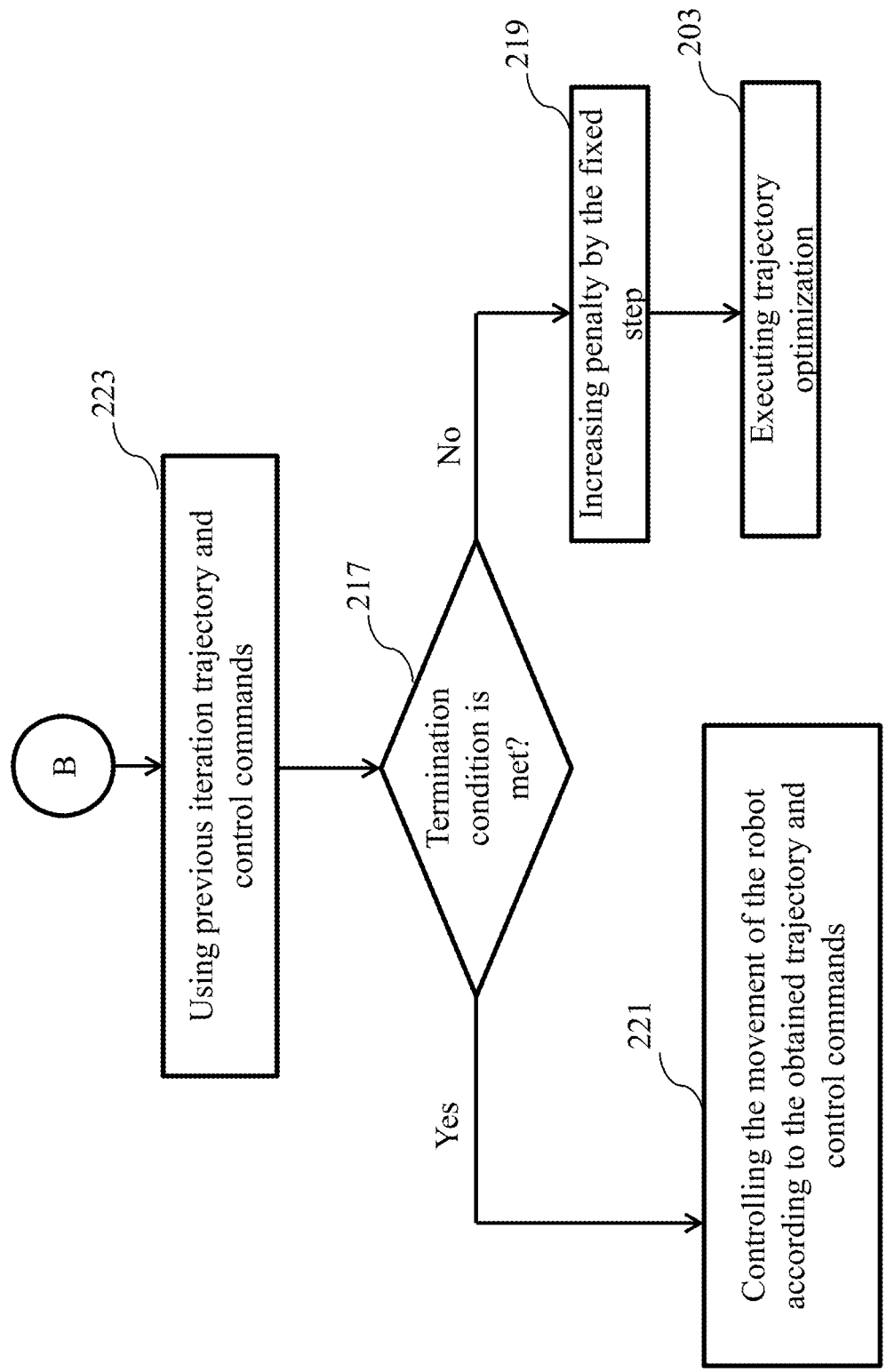
FIG. 2C illustrates steps executed by the penalty algorithm when the updated trajectory does not satisfy the pose constraints, according to an embodiment of the present disclosure.

FIG. 2C illustrates steps executed by the penalty algorithm when the updated trajectory does not satisfy the pose constraints 131, according to an embodiment of the present disclosure.

In case the updated trajectory obtained after the post processing (at step 215) does not satisfy the pose constraints 131, the control passes to step 223.

At step 223, previous iteration trajectory and associated control commands may be used as an optimal solution. Further, the control passes to step 217.

At step 217, it may be determined whether the termination condition 139 is met. The control passes to step 219, in case the termination condition 139 is not met. Otherwise, the control passes to step 221.

At step 219, the penalty value may be increased by a fixed step when the termination condition 139 is not met. Further, the control passes to step 203.

At step 221, the robot 101 may be controlled according to the current trajectory and the associated current control commands. In some embodiments, the actuator 125 is controlled to move the robot arm 103 according to the trajectory and the associated control commands. The execution of the steps of the penalty algorithm ends after the execution of step 219.

Figure 2D:
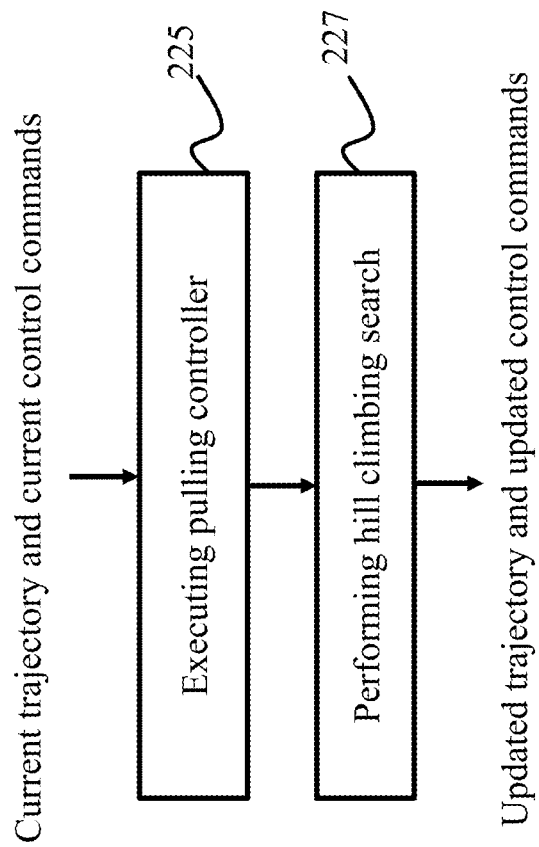
FIG. 2D illustrates steps executed during post processing, according to an embodiment of the present disclosure.

FIG. 2D illustrates steps executed during post processing, according to an embodiment of the present disclosure. The post processing is executed when for the current trajectory determined by the penalty algorithm, the average stiffness value is less than the threshold stiffness value required to move the robot arm 103 according to the current trajectory. After obtaining the current trajectory, associated current control commands, and current virtual stiffness values, the method start at step 225.

At step 225, the pulling controller 135 may be executed to attract virtually active robot end effector 105 to the corresponding contact candidate from the candidates 107a, 107b, 107c, and 107d on the object 107 in the environment 100 to facilitate physical contacts. The pulling controller 135 is executed based on the current trajectory, the current control commands, and the current virtual stiffness values. Further, as the distance between the robot end effector 105 and the contact candidates 107a, 107b, 107, and 107d becomes smaller, the stiffness values considered for executing the current trajectory may lead to excessively large virtual forces. To overcome such situation, the control passes to step 227.

At step 227, a hill-climbing search (HCS) operation may be performed. The HCS operation results in reduction of non-zero stiffness values by the change of the normalized final cost divided by the previous change as long as the nonlinear pose error decreases. Reducing the non-zero stiffness values leads to the suppression of virtual forces explicitly. Thus, the current trajectory, the associated control commands, and the virtual stiffness values are improved by the post processing to produce the updated trajectory, the updated control commands, and the updated virtual stiffness values. The updated trajectory is further analysed in the penalty loop algorithm to check whether the updated trajectory satisfies the pose constraints 131 or not.

In some embodiments, the post processing is used to improve the output trajectory and associated control commands, determined by the penalty loop algorithm, explicitly by exploiting the contact information implied by the utilization of relaxation. For example, for a contact pair p and a control period i, a pulling force $f(p,i) \in R^3$ is calculated from a distance vector $d(p,i) \in R^3$ and the associated virtual stiffness value $k(p, i)$, where the pulling force is given as:

$$a \cdot f(p,i) = k(p,i)d(p,i), \quad (1)$$

where, d is the vector from the center of mass of the contact candidate on the robot 101 (i.e. the end effector 105) to the point that is offset from the center of the contact candidate in the environment 100. In an example embodiment, the offset may be arbitrarily initialized at 5 cm for the first penalty iteration and obtained for the following iterations by dividing the initial offset by the number of successful penalty iterations. This offset helps reaching occluded surfaces in the environment 100. In another embodiment, a potential field approach may be used with repulsive forces on the surfaces 107a, 107b, 107c, and 107d with zero stiffness values.

The corresponding generalized joint force vector $\tau_{pull} \in R^{n_a}$ can be calculated by:

$$\tau_{pull}(p,i) = J_t^T(p,i)f(p,i) \quad (2)$$

where $J_t(p,i) \in R^{3 \times n_a}$ is the translational Jacobian matrix for the center of mass of the contact candidate on the robot 101.

In order to prevent the pulling force generating abrupt motions for large stiffness values, the damping controller 141 may be applied to keep the joint velocities close to the planned motion, where the damping force may be given as:

$$\tau_{damp}(p,i) = K_v S_a^T M(q) \dot{q}_e(p,i) \quad (3)$$

where $K_v \in R_a^n$ is a positive-definite gain matrix, $\dot{q}_e(p,i) \in R^{n_a}$ is the deviation of the joint velocities from the planned velocities and $\tau_{damp} \in R^{n_a}$ is the generalized joint forces for damping. In some embodiments, this computation can be done efficiently by using the sparse form of the inertia matrix.

Some embodiments are based on the realization that the relaxed contact model 123 may be used to achieve a contact-implicit trajectory optimization framework that can plan contact-interaction trajectories (such as the trajectory 111) for different robot architectures and tasks using a trivial initial guess and without requiring any parameter tuning. A mathematical representation of the dynamics of an under-actuated system with $n_a$ actuated DOF and nu unactuated DOF, subject to both the virtual forces generated by the relaxed contact model 123 and the external forces due to the frictional rigid-body contact mechanics in the physical world may be given as follows:

$$M(q)\ddot{q} + c(q,\dot{q}) = S_a^T \tau + J_c^T(q)\lambda_c + S_u^T \lambda_v \quad (4)$$

where $q \triangleq [q_a^T, q_u^T]^T \in R^{n_a + n_u}$ is the configuration vector; $M(q) \in R^{(n_a+n_u) \times (n_a+n_u)}$ is the mass matrix; $c(q,\dot{q}) \in R^{n_a+n_u}$ represents the Coriolis, centrifugal, and gravitational terms; $S_a = [I_{n_a \times n_a} \, 0_{n_a \times n_u}]$ is the selection matrix for the actuated DOF and $S_u = [0_{n_u \times n_a} \, I_{n_u \times n_u}]$ is the selection matrix for the unactuated DOF; $\tau \in R^{n_a}$ is the vector of generalized joint forces; $\lambda_c \in R^{6n_c}$ is the vector of generalized contact forces at $n_c$ contact points $J_c(q) \in R^{6n_c \times (n_a+n_u)}$ is the Jacobian matrix mapping the joint velocities to the Cartesian velocities at the contact points and $\lambda_v \in R^{n_u}$ is the vector of generalized contact forces on the unactuated DOF generated by the contact model.

In another embodiment, for $n_f$ free bodies in Special Eucledian (SE) group, for example SE(3) (e.g. free objects or the torso of a humanoid) $n_u = 6n_f$. The state of the system is represented by $x \triangleq [q^T \dot{q}^T]^T \in R^n$ where $n=2 \, (n_a+n_u)$. There are two types of contact mechanics in this system: (i) contact forces due to actual contacts in the simulated world (i.e. contacts detected by the physics engine) which are effective on all DOF; and (ii) virtual forces due to the contact model and exerted only on the unactuated DOF.

In another embodiment, the generalized joint forces are decomposed as $\tau = \tau_u + \tilde{c} - \tilde{J}_c^T \tilde{\lambda}_c$, where $\tilde{c}$, $\tilde{J}_c^T$, and $\tilde{\lambda}_c$ are the estimations of $c=(q,\dot{q})$, $J_c^T(q)$, and $\lambda_c$; and $\tau_u \in R^{n_a}$ is the vector of control variables associated with the joint forces. This helps to center the optimization problem in terms of the joint forces meaning the control term is linearly related to the accelerations even if there are external contacts.

Some embodiments are based on the realization that contact-implicit manipulation is used to define a manipulation task (prehensile task or non-prehensile task) as an optimization problem in which the contact schedule and corresponding forces are found as a result of a trajectory optimization. The selection of the contact model is crucial.

In the present disclosure, relaxed contact model 123 is used to facilitate the convergence of gradient based solvers. The relaxed contact model 123 considers $n_p$ pairs of pre-defined contact candidates on the robot 101 (e.g. the end-effector links 105) and in the environment 100 (e.g. the surfaces 107a, 107b, 107c, and 107d of the object 107). For each contact pair, the magnitude of the virtual force normal to the surface $\gamma \in R$ is calculated by $\gamma(q)=ke^{-\alpha\phi(q)}$ using the signed distance between the contact candidates $\phi \in R$, the virtual stiffness k, and the curvature a. The corresponding generalized virtual force acting on the free body associated with the contact pair $\lambda_v \in R^6$ is calculated by $\lambda_v(q)=\gamma(q)[I_3-\hat{l}]^T n(q)$, where $I_3$ is 3×3 identity matrix, l is the vector from the center of mass of the free body to the nearest point on the contact candidate on the robot 101, $\hat{l}$ is the skew-symmetric matrix form of l that performs the cross product, and $n \in R^3$ is the contact surface normal. The net virtual force acting on a free body is the sum of the virtual forces corresponding to the contact candidates associated with that body. As a result, the virtual forces provide a smooth relationship between the dynamics of the free bodies and the configuration of the system.

Further, in the VSCM, the virtual stiffness values $k \in R^{n_p}$ are decision variables of the optimization. Thus, the vector of control variables is $u \triangleq [\tau_u^T, k^T]^T \in R^m$ where $m=n_a+n_p$.

Some embodiments are based on the realization that the trajectory optimization may be used to determine an optimal trajectory 111 for a given high-level task. To that end, the robot 101 determines the trajectory 111 based on trajectory optimization approach that minimizes virtual forces while satisfying the pose constraints 131 associated with the determined trajectory 111. A finite-dimensional trajectory optimization problem for N time steps can be written in terms of state and control trajectories $X \triangleq [x_1, \ldots, x_{N+1}]$ and $U \triangleq [u_1, \ldots, u_N]$; final and integrated cost terms $C_F$ and $C_I$; and lower and upper control and state bounds $u_L$, $u_U$, $x_L$, and $x_U$:

$$\underset{U}{\text{minimize}} \, C(X, U) \triangleq C_F(x_{N+1}) + \sum_{i=1}^{N} C_I(x_i, u_i) \tag{5a}$$

subject to:

$$x_{i+1}=f(x_i, u_i) \text{ for } i=1, \ldots, N \tag{5b}$$

$$u_L \leq u_{1, \ldots, N} \leq u_U, x_L \leq x_{1, \ldots, N+1} \leq x_U \tag{5c}$$

where $x_{i+1}=f(x_i, u_i)$ describes the evolution of the nonlinear dynamics over a control period i.

Some embodiments define locomotion and non-prehensile manipulation tasks based on the desired torso/object configurations. To that end, a weighted quadratic final cost based on the deviations of the position and orientation of the free body from the desired pose, pe and θe is used:

$$C_F = w_1 p_e^2 + w_2 p \theta_e^2 \tag{6}$$

where $w_1$ and $w_2$ are the weights. To suppress all virtual forces, the $L^1$-norm of the virtual stiffness variables is penalized in the integral cost:

$$C_I = \omega \|k_i\|_1 \tag{7}$$

Further, the penalty co is adjusted by the penalty loop module 129 that includes instructions that corresponds to the steps of the penalty loop algorithm.

Some embodiments are based on the realization that non-convexity (or non-linearity of dynamics associated with trajectories) may arise from objective function, from state or control constraints, or from nonlinear dynamics. The first is usually easy to manage by transferring the non-convexity from the objective to the constraints through a change of variables. For the second case, it is required to convert non-convex constraints (state or control constraints, nonlinear dynamics) to convex constraints while guaranteeing an optimal solution. The successive convexification (SCVX) is an algorithm for solving optimal control problems with non-convex constraints or dynamics by iteratively creating and solving a sequence of convex problems. This algorithm is described below.

The SCVX algorithm is based on repeating three main steps in succession: (i) linearizing non-convex constraints (e.g. the nonlinear dynamics) about the trajectory from the previous succession, (ii) solving the resulting convex subproblem, subject to a trust-region constraint that avoids artificial unboundedness due to linearization, and (iii) adjusting the trust-region radius based on the fidelity of the linear approximations.

The convex subproblem is given by:

$$\underset{\delta x_1, \ldots, \delta x_{N+1}, \delta u_1, \ldots, \delta u_N}{\text{minimize}} \, L \triangleq C(X^S + \delta X, U^S + \delta U) \tag{8a}$$

subject to:

$$\delta_{x_{i+1}} = A_i \delta_{x_i} + B_i \delta_{u_i} \text{ for } i=1, \ldots, N, \tag{8b}$$

$$x_L \leq x_i^S + \delta_{x_i} \leq x_U \text{ for } i=1, \ldots, N+1 \tag{8c}$$

$$u_L \leq u_i^S + \delta u_i \leq u_U \text{ for } i=1, \ldots, N, \tag{8d}$$

$$\|\delta X\|_1 + \|\delta U\|_1 \leq r^s \tag{8e}$$

where $(X^S, U^S)$ is the trajectory from the succession s; $A_i \triangleq \partial f(x_i, u_i)/\partial x_i|_{x_i^s, u_i^s}$; $B_i \triangleq \partial f(x_i, u_i)/\partial u_i|_{x_i^s, u_i^s}$; $\delta x_i \triangleq x_i - x_i^s$; $\delta u_i \triangleq u_i - u_i^s$ and r is the trust-region radius. Additionally, virtual controls can be added to this problem to prevent artificial infeasibility due to linearization.

The convex subproblem is a simultaneous problem, and therefore has a larger size but a sparse structure, which can be exploited by a suitable solver. After solving the convex subproblem, only the change for controls is applied instead of applying the changes for both states and controls. The state trajectory is then recalculated by rolling-out the dynamics. Such modification prevents the accumulation of defects (i.e. $f(x_i, u_i) - x_{i+1}$) that may occur when using the penalty approach in the original method, and improves the convergence speed by allowing larger trust regions in our experiments. As a result, the modified method combines the numerical efficiency of direct methods and the accuracy of shooting methods.

Figure 2E:
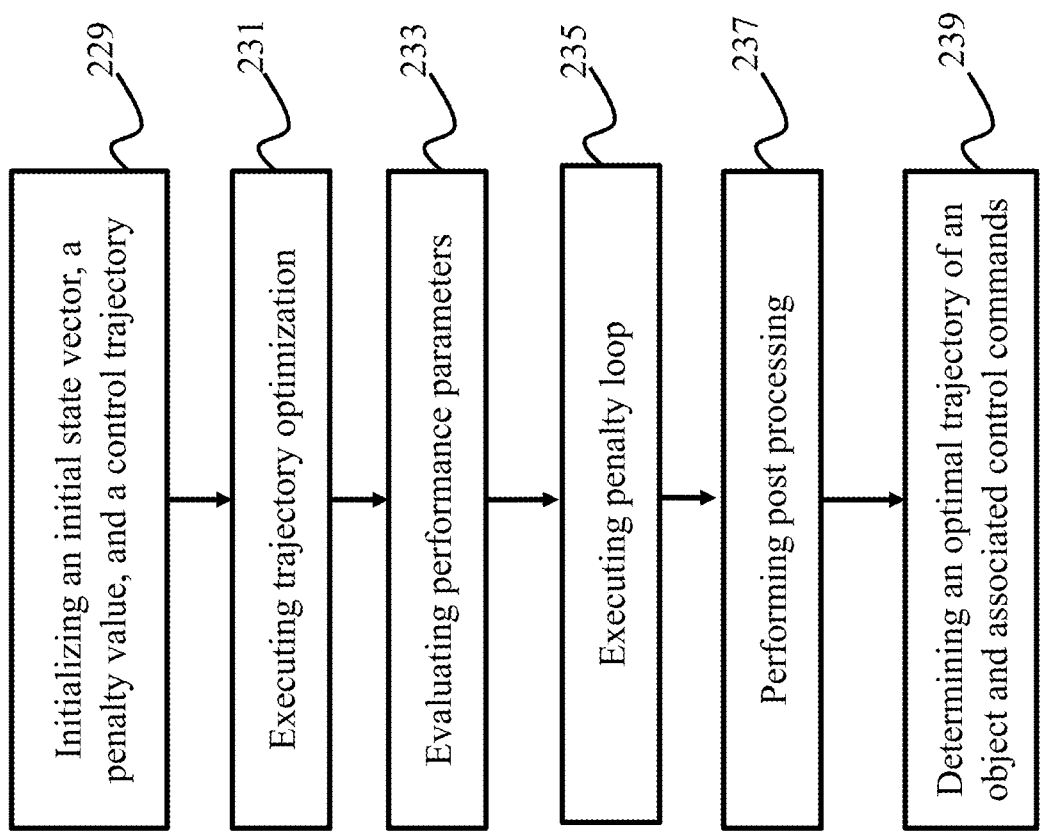
FIG. 2E illustrates steps of a method executed by the robot for performing the task involving moving an object from an initial pose of the object to a target pose of the object, according to an embodiment of the present disclosure.

FIG. 2E illustrates steps of a method executed by the robot 101 to perform a task involving moving an object 107 from an initial pose to a target pose 113, according to an embodiment of the present disclosure. The method is executed by the processor 117 of the robot 101. The method starts from step 229.

At step 229, an initial state vector, a penalty value, and a control trajectory may be initialized to determine optimal state and control trajectories. The initial values may correspond to start values of the control trajectories. In some embodiments, the initial values may be predefined for the robot 101. In some other embodiments, the initial values may be manually provided by a user. Further, a current state of interaction between the robot 101 and the object 107 is obtained via the input interface 115 to determine a complete trajectory.

At step 231, the SCVX algorithm may be executed to solve the trajectory optimization problem that is non-convex because of the nonlinear dynamics in a numerically-efficient manner.

At step 233 performance measurement parameters (such as position error, orientation error, average stiffness value, and maximum stiffness value) associated with the trajectory may be evaluated. The position and orientation errors are comprised by the pose constraints 131. The performance measurement parameters may be used for optimizing the trajectory in order to obtain an optimized trajectory 111. To that end, the control passes to step 235.

At step 235, the penalty loop algorithm may be executed. The penalty loop is executed to iteratively determine, until the termination condition 139 is met, a trajectory 111 of the object 107 and associated control commands for controlling the robot 101 to move the object 107 according to the trajectory 111 by performing optimization reducing, e.g., minimizing, the stiffness of the virtual force and reducing, e.g., minimizing, a difference between the target pose 113 of the object 107 and a final pose of the object 107 moved from the initial pose by the robot 101. The termination condition 139 may be met in case a number of iterations is greater than a first threshold or the virtual forces are reduced to zero. The robot 101 is controlled based on the control commands via the virtual force generated in accordance with the relaxed contact model 123.

To that end, different penalty is assigned to relaxation parameters such as the virtual stiffness based on the determination that whether the calculated trajectory satisfies the pose constraints 131 or not. By changing the penalty on the relaxation parameters dynamically based on the pose constraints 131, penalty algorithm gradually reduces the virtual forces to zero so that the task is performed using only physical forces. Further, it is determined whether the average stiffness value is less than a threshold stiffness value required to move the robot arm 103 according to the trajectory determined by the penalty loop algorithm. Further, the control passes to step 237.

At step 237, the post processing may be executed on the current trajectory to attract the robot links (or robot end effector 105 of the robot arm 103) associated with the non-zero stiffness values towards the corresponding contact candidates in the environment 100 using a pulling controller 135. To that end, the processor 117 is configured to exploit information associated with residual virtual stiffness variables that indicate the position, timing, and magnitude of forces required to complete the task of moving the object from the initial pose of the object to the target pose 113 of the object. Further, the control passes to step 239.

At step 239, optimal trajectory and associated control commands may be determined based on the determination that whether the trajectory updated using the post processing in step 237 satisfies the termination condition 139, where the termination condition 139 may be met in case a number of iterations is greater than a first threshold or the virtual forces are reduced to zero. In some embodiments, the optimal trajectory satisfies both the pose constraints 131 and the termination condition 139.

In some embodiments, the optimal trajectory may be determined based on the determination that the trajectory determined in the penalty loop algorithm comprises the average stiffness values less than the threshold stiffness value, and the trajectory satisfies the termination condition 139. Further, the control commands may be used by the robot 101 to move the robot end effector 105 along the optimal trajectory to move the object 107 to the target pose 113.

Accordingly, the object 107 is moved from the initial pose to the target pose 113 in accordance with the optimized trajectory.

In example embodiments, the trajectory optimization, using the penalty loop approach and the post processing, is implemented in four different robot applications as shown in FIG. 3A, FIG. 3B, FIG. 3C, and FIG. 3D.

FIG. 3A illustrates controlling a 1-degree of freedom (DOF) push slider system 301 based on optimized trajectory and associated control commands, according to an example embodiment of the present disclosure. The system 301 is configured to perform a pushing task with a single control time step of 1 sec. The system 301 performing the pushing task includes a contact pair that includes a tip 309 of a pusher 311 and a front face 313 of the slider 303. The system 301 may include the relaxed contact model 123 to determine optimized trajectory and associated control commands.

Further, the system 301 pushes the slider 303 (20 cm) in a single direction (e.g. a forward direction 305) to reach a target pose 307 of the slider (for example, a box 303) based on the optimized trajectory and associated control commands determined by the relaxed contact model 123.

FIG. 3B illustrates controlling a 7-DOF robot 315 based on optimized trajectory and associated control commands, according to an example embodiment of the present disclosure. In an example embodiment, the 7-DOF robot 315 may be a Sawyer Robot. In addition to pushing the box 319 forward, the 7-DOF robot 315 may perform side and diagonal pushes. The 7-DOF robot 315 has four contact pairs between side faces 321a and 321b of the box 319 and a cylindrical end-effector flange 311. In an example embodiment, the 7-DOF robot 315 performs three forward pushing tasks to move the box 319. An optimized trajectory and associated control commands are determined, using the relaxed contact model 123, for slight motions or impulsive motions to move the box 319 out of the workspace of the 7-DOF robot 315.

FIG. 3C illustrates controlling a mobile robot with a cylindrical holonomic base 323 based on optimized trajectory and associated control commands, according to an example embodiment of the present disclosure. In an example embodiment, the mobile robot 323 may be a Human Support Robot (HSR) with a cylindrical holonomic base used for contacting the environment.

In order to perform a task of pushing a box 325 using a velocity-controlled holonomic base 327 of the HSR, 323, an optimized trajectory and the control commands are determined for the HSR 323 by the relaxed contact model 123. As shown in FIG. 3C, there are four contact pairs between the side faces of the box 325 and a cylindrical base 327 of the HSR 323. Since translational and rotational velocities are bounded by ±2 m/s and ±2 rad/s, a longer simulation time of 5 sec and a larger control sampling period of 0.5 sec are used to perform different tasks. A forward pushing task to move the box 325 by 50 cm and two diagonal pushing tasks are performed by the HSR 323. It is observed that when the default friction coefficient of the physics engine is used ($\mu=1$), the HSR 323 heavily relies on the frictional forces for the diagonal pushes, which seems unrealistic. In order to avoid this problem, the task is repeated using $\mu=0.1$.

FIG. 3D illustrates controlling a humanoid like robot 329 with a prismatic torso and cylindrical arms 331a, 331b, and legs 331*c*, 331*d* with 2-DOF based on optimized trajectory and associated control commands, according to an example embodiment of the present disclosure.

A planar, humanoid like robot 329 is controlled in accordance with the optimal trajectory and the associated control commands for a locomotion application, where the humanoid like robot 329 can make and break multiple contacts simultaneously. The environment comprising the humanoid like robot 329 has zero gravity which avoids stability constraints. The task is specified in terms of the torso's desired pose which the humanoid like robot 329 can reach by using four static bricks in the environment, as shown in FIG. 3D. However, as the motion is frictionless, the humanoid like robot 329 may use contacts to slow down or stop. As shown in FIG. 3D, there are 8 contact candidates that are front and rear faces of the bricks, and 4 contact candidates on the humanoid like robot 329 that are the end links of the arms and the legs. These candidates are paired based on the sides, so that there are 16 contact candidates in total. Leg contacts are not needed to complete the tasks, however the legs contacts are included as contact candidates to show that extra or unnecessary contact pairs do not hinder the performance of the proposed method.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A robot configured for performing a task involving moving an object from an initial pose of the object to a target pose of the object in an environment, the robot comprising:
an input interface configured to accept contact interactions between the robot and the environment;
a memory configured to store a dynamic model representing one or more of geometric, dynamic, and frictional properties of the robot and the environment, and a relaxed contact model to represent dynamic interactions between the robot and the object via virtual forces generated by one or more contact pairs associated with a geometry on the robot and a geometry on the object, where the virtual force acting on the object at a distance in each contact pair is in proportion to a stiffness of the virtual force;
a processor configured to determine, iteratively until a termination condition is met, a trajectory, associated control commands for controlling the robot, and virtual stiffness values to move the object according to the trajectory by performing optimization reducing the stiffness of the virtual force and reducing a difference between the target pose of the object and a final pose of the object moved from the initial pose by the robot controlled according to the control commands via the virtual force generated according to the relaxed contact model, wherein for executing at least one iteration, the processor is configured to:
determine a current trajectory, current control commands, and current virtual stiffness values for a current penalty value on the stiffness of the virtual force by solving an optimization problem initialized with a previous trajectory and previous control commands determined during a previous iteration with a previous penalty value on the stiffness of the virtual force;
update the current trajectory and current control commands to reduce the distance in each contact pair to produce an updated trajectory and updated control commands to initialize the optimization problem in a next iteration; and
update the current value of the stiffness of the virtual force for the optimization in the next iteration; and
an actuator configured to move a robot arm of the robot according to the trajectory and the associated control commands, wherein the memory is further configured to store a pulling controller which uses virtual forces left after computing the current trajectory to attract the geometry on the robot to the corresponding geometry in the environment to facilitate physical contacts.

2. The robot of claim 1,
wherein the virtual force corresponding to the contact pair is based on one or more of the stiffness of the virtual force, a curvature associated with the virtual force, and a signed distance between the geometry on the robot and a geometry in the environment associated with the contact pair.

3. The robot of claim 1,
wherein the virtual force points, at each instance of time during the interaction, a projection of a contact surface normal onto a center of mass of the object.

4. The robot of claim 1,
wherein the optimization corresponds to a multi-objective optimization of a cost function, wherein the processor is further configured to perform the multi-objective optimization of the cost function, and
wherein the cost function is a combination of:
a first cost to determine a positioning error of the final pose of the object moved by the robot with respect to the target pose of the object, and
a second cost to determine a cumulative stiffness of the virtual forces.

5. The robot of claim 1, wherein for executing the at least one iteration, the processor is further configured to:
perform a trajectory optimization problem using a successive convexification;

assign a first penalty value, as an updated penalty value, to the stiffness associated with the virtual forces, wherein the assigned penalty value is greater than a penalty value assigned in a previous iteration if pose constraints are satisfied, and wherein the pose constraints comprise information about position error and orientation error associated with the trajectory;

determine the current trajectory, the current control commands, and current virtual stiffness values satisfying the pose constraints, and residual stiffness indicating position, timing, and magnitude of physical forces for performing the task; and execute the pulling controller on the current trajectory to determine the pulling force for pulling contact pairs on the robot associated with non-zero stiffness values towards the corresponding contact pairs in the environment.

6. The robot of claim 5, wherein the processor is further configured to:

assign a second penalty value, as the updated penalty value, to the stiffness associated with the virtual forces, wherein the assigned penalty value is less than a penalty value assigned in a previous iteration if the pose constraints are not satisfied; and perform the trajectory optimization problem using the successive convexification.

7. The robot of claim 5, wherein the processor is further configured to execute the pulling controller based on an average of the stiffness, when the average of the stiffness is greater than a stiffness threshold.

8. The robot of claim 5, wherein to determine the pulling force, the processor is further configured to execute the pulling controller based on a prior stiffness, and wherein the prior stiffness indicates position, timing, and magnitude of physical forces associated with the previous iteration.

9. The robot of claim 5, wherein the memory further stores a hill-climbing search, and wherein the processor is further configured to execute the hill-climbing search to reduce the non-zero stiffness values to eliminate excessive virtual forces.

10. The robot of claim 1, wherein the task comprises at least one of a non-prehensile operation or a prehensile operation.

11. The robot of claim 1, wherein the termination condition is met when:

a number of iterations is greater than a first threshold, or the virtual stiffness values are reduced to zero.

12. A method for performing, by a robot, a task involving moving an object from an initial pose of the object to a target pose of the object, wherein the method uses a processor coupled with instructions implementing the method, wherein the instructions are stored in a memory, wherein the memory storing a dynamic model representing one or more of geometric, dynamic, and frictional properties of the robot and the environment, and a relaxed contact model to represent dynamic interactions between the robot and the object via virtual forces generated by one or more contact pairs associated with a geometry on the robot and a geometry on the object, where the virtual force acting on the object at a distance in each contact pair is in proportion to a stiffness of the virtual force, and wherein the instructions, when executed by the processor carry out steps of the method, comprising:

obtaining a current state of interaction between the robot and the object; and determining, iteratively until a termination condition is met, a trajectory, associated control commands for controlling the robot, and virtual stiffness values to move the object according to the trajectory by performing optimization minimizing the stiffness of the virtual force and minimizing a difference between the target pose of the object and a final pose of the object moved from the initial pose by the robot controlled according to the control commands via the virtual force generated according to the relaxed contact model, wherein for executing at least one iteration, the method further comprising:

determining a current trajectory, current control commands, and current virtual stiffness values for a current penalty value on the stiffness of the virtual force by solving an optimization problem initialized with a previous trajectory and previous control commands determined during a previous iteration with a previous penalty value on the stiffness of the virtual force;

updating the current trajectory and current control commands to reduce the distance in each contact pair to produce an updated trajectory and updated control commands to initialize the optimization problem in a next iteration; and updating the current value of the stiffness of the virtual force for the optimization in the next iteration;

performing a trajectory optimization problem using successive convexification;

assigning a first penalty value, as an updated penalty value, to the stiffness associated with the virtual forces, wherein the assigned penalty value is greater than a penalty value assigned in a previous iteration if pose constraints are satisfied, and wherein the pose constraints comprise information about position and orientation errors associated with the trajectory;

determining the current trajectory and the control commands satisfying the pose constraints, and residual stiffness indicating position, timing, and magnitude of physical forces for performing the task;

executing a pulling controller on the current trajectory to determine the pulling force for pulling contact pairs on the robot associated with non-zero stiffness towards the corresponding contact pairs in the environment and moving a robot arm of the robot according to the trajectory and the associated control commands.

13. The method of claim 12, further comprising:

assigning a second penalty value, as the updated value, to the stiffness associated with the virtual forces, and wherein the assigned penalty value is less than a penalty value assigned in a previous iteration if the pose constraints are not satisfied; and performing a trajectory optimization problem using the successive convexification.

14. A non-transitory computer readable storage medium, embodied thereon a program executable by a processor for performing a method moving an object from an initial pose of the object to a target pose of the object, wherein the medium storing a dynamic model representing one or more of geometric, dynamic, and frictional properties of the robot and the environment, and a relaxed contact model to represent dynamic interactions between the robot and the object via virtual forces generated by one or more contact pairs associated with a geometry on the robot and a geometry on the object, where the virtual force acting on the object at a distance in each contact pair is in proportion to a stiffness of the virtual force, the method comprising:

obtaining a current state of interaction between the robot and the object; and determining, iteratively until a termination condition is met, a trajectory, associated control commands for controlling the robot, and virtual stiffness values to move the object according to the trajectory by performing optimization minimizing the stiffness of the virtual force and minimizing a difference between the target pose of the object and a final pose of the object moved from the initial pose by the robot controlled according to the control commands via the virtual force generated according to the relaxed contact model, wherein for executing at least one iteration, the method further comprising:

determining a current trajectory, current control commands, and current virtual stiffness values for a current penalty value on the stiffness of the virtual force by solving an optimization problem initialized with a previous trajectory and previous control commands determined during a previous iteration with a previous penalty value on the stiffness of the virtual force;

updating the current trajectory and current control commands to reduce the distance in each contact pair to produce an updated trajectory and updated control commands to initialize the optimization problem in a next iteration; and updating the current value of the stiffness of the virtual force for the optimization in the next iteration;

performing a trajectory optimization problem using successive convexification;

assigning a first penalty value, as an updated penalty value, to the stiffness associated with the virtual forces, wherein the assigned penalty value is greater than a penalty value assigned in a previous iteration if pose constraints are satisfied, and wherein the pose constraints comprise information about position and orientation errors associated with the trajectory;

determining the current trajectory and the control commands satisfying the pose constraints, and residual stiffness indicating position, timing, and magnitude of physical forces for performing the task;

executing a pulling controller on the current trajectory to determine the pulling force for pulling contact pairs on the robot associated with non-zero stiffness towards the corresponding contact pairs in the environment and moving a robot arm of the robot according to the trajectory and the associated control commands.

* * * * *